US006986410B2

(12) United States Patent
Simmons et al.

(10) Patent No.: US 6,986,410 B2
(45) Date of Patent: Jan. 17, 2006

(54) MULTIPLE FEED BRAKE CALIPER

(75) Inventors: Walter Joseph Simmons, North Hills, CA (US); William Dale Woolum, Beckley, WV (US)

(73) Assignee: Leisure Products, Inc., Arrington, VA (US)

( * ) Notice: Subject to any disclaimer, the term of this patent is extended or adjusted under 35 U.S.C. 154(b) by 0 days.

(21) Appl. No.: 10/457,391

(22) Filed: Jun. 10, 2003

(65) Prior Publication Data
US 2004/0251093 A1 Dec. 16, 2004

(51) Int. Cl.
*F16D 55/18* (2006.01)
(52) U.S. Cl. .................... 188/72.4; 188/71.1; 180/210
(58) Field of Classification Search ............... 188/72.4, 188/72.5, 73.1, 71.1, 72.1, 73.45, 106 F, 188/141, 355, 358, 359; 180/210, 211, 215, 180/325; D12/85, 107, 112
See application file for complete search history.

(56) References Cited

U.S. PATENT DOCUMENTS

| 4,991,695 | A | 2/1991 | Hellmer |
| 5,297,856 | A | 3/1994 | Asano |
| 5,810,121 | A | 9/1998 | Anger |
| 5,957,245 | A | 9/1999 | Anger |
| 6,244,391 | B1 | 6/2001 | Bunker |
| 6,371,250 | B1 | 4/2002 | Bunker |

FOREIGN PATENT DOCUMENTS

| JP | 10030660 A | * | 2/1998 |
| JP | 10259833 A | * | 9/1998 |
| JP | 02003240028 A | * | 8/2003 |

OTHER PUBLICATIONS

Motorcycle Review Honda's 1998 VFR800FI Interceptor. Web pages (3 sheets) [Online]. Original publication date uncertain [retrieved Apr. 28, 2003]. Retrieved from internet. <URL: http://www.womanmotorist.com/motorcycles/reviews/honda-98vfr800fi-2.shtml>.
Untitled schematic of Honda Linked Braking System. Web page [Online]. Orignal publication date uncertain [retrieved Apr. 28, 2003]. Retrieved from internet. <URL:http://www.cmgonline.com/articales/CMG02/bikes/Honda/VFR800/technical/BigP/LBS_schematic.html>.

* cited by examiner

*Primary Examiner*—Pam Rodriguez
(74) *Attorney, Agent, or Firm*—Bruce E. Weir

(57) ABSTRACT

A disc brake caliper for conversion of a motorcycle with a linked braking system to a trike integrates two or more separate sets of opposed braking cylinders and pads within a single housing. Braking cylinder sets are not connected to other braking cylinder sets within the housing. Each set of braking cylinders is connected to and actuated independently by a different master cylinder. At least two braking cylinder sets within a housing have different diameters, the diameters of each set being chosen to produce a desired amount of braking pressure in response to an expected amount of hydraulic pressure from a master cylinder actuating the set. Both the diameter of each braking cylinder set and ratio of diameters between different braking cylinder sets are chosen to produce the optimum rear wheel braking pressure allocation for a given braking control system and vehicle configuration with no changes to the master cylinders or the front wheel braking system.

1 Claim, 6 Drawing Sheets

MULTIPLE FEED BRAKE CALIPER

CROSS-REFERENCE TO RELATED APPLICATIONS

None.

BACKGROUND AND SUMMARY

Motorcycle enthusiasts number in the hundreds of thousands. Many riders, especially those who enjoy long-distance touring, prefer the power and stability of large touring bikes. To gain additional stability and load-carrying capacity, a sizeable minority have opted to convert their two-wheeled motorcycles to three-wheeled vehicles, or "trikes."

In such a conversion most of the systems of the motorcycle are typically retained except for the rear portions of the drive train, the rear suspension, and the rear brake system. However, since the handling characteristics of a three-wheeled vehicle are very different than those of a two-wheeled vehicle, some modifications are needed to allow safe and comfortable operation of the vehicle.

Safe and effective modifications to the brake system are especially critical. Motorcycles have traditionally employed a foot pedal to actuate the rear brake and a hand lever to actuate the front brake. In motorcycles with hydraulic braking systems, the foot pedal and the hand lever each actuate a different master cylinder.

Since a motorcycle tends to pitch forward when braking, placing more downward, friction-producing force on the front wheel, skilled operators usually apply more braking pressure to the front wheel than to the rear wheel. However, relatively unskilled motorcycle operators often instinctively rely too heavily on the rear brake to stop the motorcycle, resulting in an uncontrolled skid. To provide safe and effective braking regardless of operator misjudgment, some motorcycle manufacturers have equipped their products with braking systems that link the front and rear brakes with control systems that allocate the optimum amount of braking pressure to each wheel no matter which master cylinder is actuated.

Linked braking systems on motorcycles usually allocate more braking pressure to the front wheel. Unfortunately, that pressure allocation is usually not suitable for a trike. The trike, of course, has two wheels in the rear. Those rear wheels are usually larger than the rear wheel of a motorcycle, resulting in more road contact area and braking friction. Also, a trike often carries more weight in the rear in the form of passengers and luggage. Diverting extra braking pressure to the front wheel of a trike may result in ineffective and erratic braking and may in some cases destabilize the vehicle.

Some modification to the braking system of a trike conversion is clearly needed, but since modifications to the original motorcycle brake master cylinders and control systems are both cost-prohibitive and likely to raise complex engineering and safety issues, most modifications known in the art have relied on various ways of connecting, disconnecting, or redirecting the master cylinder outputs.

In one known modification the outputs from the front and rear master cylinders are directly connected. This modification provides no ability to optimize the front-to-rear braking pressure allocation and often produces an odd "feel" to the brake foot pedal, causing the pedal to "drop" and the trike to roll backward slightly once the vehicle has stopped and the braking pressure has eased.

In another known modification, one master cylinder is simply disconnected and remaining master cylinder (usually the rear) is used to drive the entire braking system. This modification allows more even pressure distribution, but greatly reduces available braking force and user control while still providing no effective means for optimizing braking pressure distribution.

Still another approach is to direct all hand lever brake pressure to the front brake and all foot pedal brake pressure to the rear brake. Although this approach preserves available braking pressure and operator control, it negates the safety features provided by linked control systems.

What is needed is a simple, safe, and inexpensive motorcycle brake system modification for motorcycle conversions that preserves the advantages of the motorcycle's original linked braking control systems, requires no changes to the original master cylinders or front braking systems, and provides a means for optimizing the front-to-rear allocation of braking pressure.

The present invention provides such a modification. A preferred embodiment of the present invention comprises a disc brake caliper that integrates two or more separate sets of opposed braking cylinders and pads within a single housing. Braking cylinder sets are not connected to other braking cylinder sets within the housing. Each set of braking cylinders is connected to and actuated independently by a different master cylinder.

The amount of braking pressure exerted by a braking cylinder set is proportional to diameter of the cylinders in the set. In a preferred embodiment of the present invention, at least two braking cylinder sets within a housing have different diameters, the diameters of each set being chosen to produce a desired amount of braking pressure in response to an expected amount of hydraulic pressure from the master cylinder actuating the set. Both the diameter of each braking cylinder set and ratio of diameters between different braking cylinder sets are chosen to produce the optimum rear wheel braking pressure allocation for a given braking control system and vehicle configuration, with no changes to the master cylinders or the front wheel braking system.

DETAILED DESCRIPTION OF THE INVENTION

Figure 1:
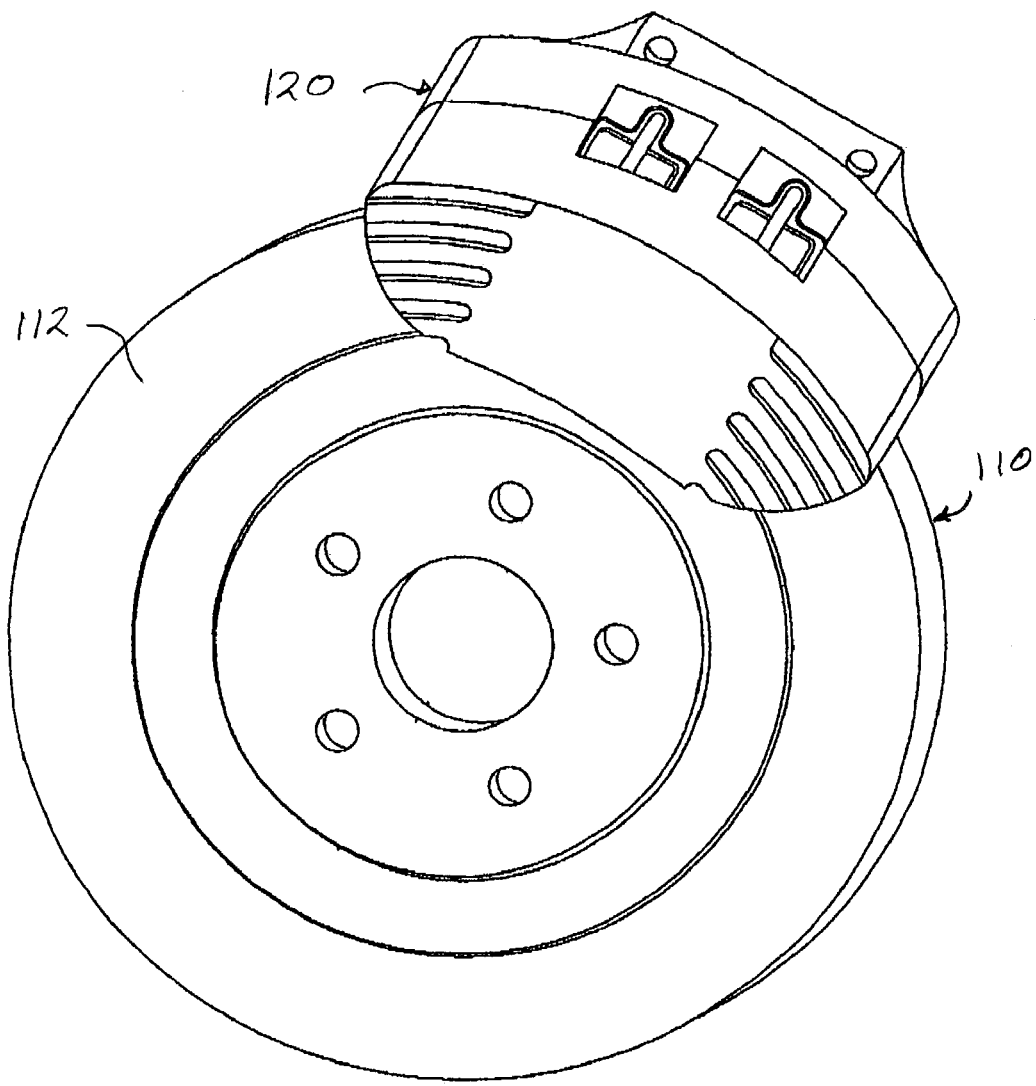
FIG. 1 is an isometric view of a brake caliper and rotor.

FIG. 1 shows a disk brake rotor and caliper. The rotor 110 is mounted on a rotating hub (not shown) that is mounted on an axle (not shown) that rotates within an upright (not shown). The hub, axle, and upright are known in the art and are not subjects of the present invention. The rotor 110 is a disk with an outer annular friction surface 112 facing away from the upright and with a substantially identical inner annular friction surface (not shown) facing toward the upright. A brake caliper 120 is mounted on the upright so that the rotor 110 may pass through a portion of the brake caliper 120 as the rotor 110 turns.

Figure 2:
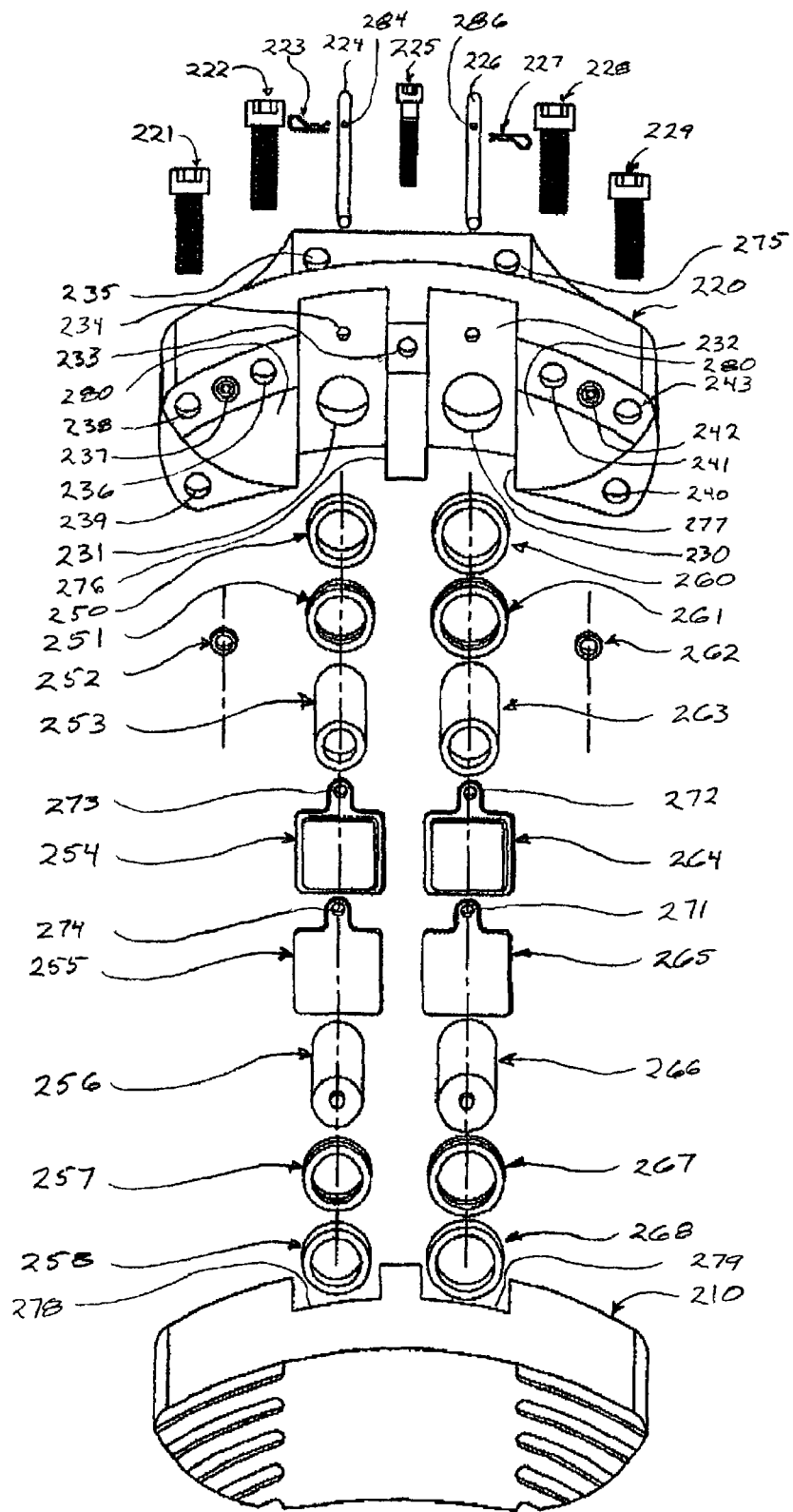
FIG. 2 is an exploded view of the brake caliper of the present invention.

FIG. 2 shows an exploded view of a preferred embodiment of the brake caliper of the present invention. An outer caliper half 210 is fastened to an inner caliper half 220 by fasteners 221, 222, 225, 228, 229, each fastener passing through a hole 238, 236, 233, 241, 243 (respectively) drilled through the inner caliper half to screw into corresponding threaded holes (not shown) in the outer caliper half 210.

In a preferred embodiment, the fasteners 221, 222, 225, 228, 229 are socket head cap screws. Screws with different caps may be used, and a fine-threaded screw may be used if the threads in the outer caliper half screw holes are roll-formed. In a preferred embodiment, the assembled caliper halves attach to the upright (not shown) via brackets (not shown) with button-head cap screws (not shown) passing through holes in mounting ears 239, 240. Other types of screws or bolts may be substituted.

A primary port 275 communicates with an inner primary cylinder 230 and an inner primary crossover port 242 through passages (not shown) within the inner caliper half 220. The hydraulic ports and passages within the present invention are preferably 0.125 inch in diameter. Larger port and passage diameters increase the volume of hydraulic fluid within the system without increasing the maximum hydraulic pressure transmitted. Smaller port and passage diameters delay the transmission of hydraulic pressure and may be used in alternate embodiments to cause delays between the application of pressure to different brake pads.

Hydraulic pressure applied at the primary port 275 is contained by a fluid seal 260 and a wiper seal 261, forcing an inner primary piston 263 against an inner primary brake pad 264. The brake pad 264 is in turn forced against the inner annular friction surface of the rotor (not shown).

In a preferred embodiment, the fluid seal 260 has a square cross-section (not shown) and the wiper seal 261 has a cruciate, or "X" cross-section (not shown). Both have inside diameters corresponding to the outside diameter of the inner primary piston 263. The wiper seal 261 is preferably a QUAD RING® manufactured by Minnesota Rubber of Minneapolis, Minn. The outer lip (not shown) of the wiper seal 261 excludes contaminants, while the inner lip (not shown) acts as both a secondary contaminant seal and a secondary fluid seal.

In a preferred embodiment, the inner primary piston 263 has an optimum outside diameter of 0.875 inch, allowing simultaneous activation of all primary pistons in the braking system while maintaining effective braking pressure. The outside diameter may range up to 1.125 inch without a significant reduction in the hydraulic force transmitted to the inner primary piston 263. Diameters larger than 1.125 inch may increase system fluid volume enough to require compensating modifications to the rear brake master cylinder (not shown in FIG. 2) and other components. The diameter may range as far below 0.875 inch as is desired, but with a proportionate loss in braking pressure. The inner primary cylinder 230 is sized to accommodate the inner primary piston 263 according to design criteria well known in the art.

When the outer caliper half 210 is fastened to the inner caliper half 220, an outer primary crossover port (not shown) aligns with the inner primary crossover port 242, and the interface between the ports is sealed by an O-ring 262. The outer caliper half 210 contains an outer primary cylinder (not shown) that is the same diameter as and axially aligned with the inner primary cylinder 230.

Hydraulic pressure applied at the primary port 275 is also transmitted from the inner primary crossover port 242 to the outer primary crossover port, then through passages (not shown) within the outer caliper half 210 to the outer primary cylinder. The hydraulic pressure is contained by a fluid seal 267 and a wiper seal 268, forcing the outer primary piston 266 against an outer primary brake pad 265. The outer primary brake pad 265 is in turn forced against the outer annular friction surface of the rotor (not shown), balancing the opposing pressure by the inner primary brake pad 264 to create braking friction.

The outer primary cylinder and corresponding seals 268, 267, piston 266, and brake pad 265 have dimensions essentially identical to those of the inner primary cylinder 230 and corresponding seals 260, 261, piston 263, and brake pad 264, respectively.

The inner primary brake pad 264 and the outer primary brake pad 265 are prevented from moving radially with respect to the rotor by a primary pin 226 that passes through a pin hole 232 through the inner caliper half, a pin hole 272 in the inner primary brake pad 264, a pin hole 271 in the outer primary brake pad 265, and into an axially-aligned pin hole (not shown) that partially penetrates the outer caliper half 210. The primary pin 226 is held in place by a retaining clip 227, a straight portion of the retaining clip 227 passing through a hole 286 in the primary pin 226 to lock the primary pin 226 and the primary brake pads 264, 265 in place. The primary brake pads 264, 265 slide freely on the primary pin 226 in directions normal to the friction surfaces of the rotor. In a preferred embodiment, the retaining clip 227 is a hairpin cotter pin, although a hammerhead cotter pin, bow tie cotter pin, and other pins known in the art can be substituted.

The inner primary brake pad 264 rests within a slot 277 milled into the inner caliper half 220. In a preferred embodiment, the slot 277 is between 0.005 inch and 0.010 inch wider than the inner primary brake pad 264, allowing the brake pad to move freely at normal operating temperatures and preventing the brake pad from moving tangentially with respect to the rotor. Similarly, the outer primary brake pad 265 rests within a slot 279 milled into the outer caliper half 210. This slot 279 is also between 0.005 inch and 0.010 inch wider than the outer primary brake pad 265 and prevents the pad from moving tangentially with respect to the rotor. An inner rotor slot 280 is milled into the lower portion of the inner caliper half 220 with a radius slightly larger than that of the rotor so as to accommodate the passage of the rotor.

The present invention additionally comprises an integral secondary braking mechanism. A secondary port 235 communicates with an inner secondary cylinder 231 and an inner secondary crossover port 237 through passages (not shown) within the inner caliper half 220. Secondary passages do not communicate with primary passages, so the primary and secondary brake assemblies may operate independently. Hydraulic pressure applied at the secondary port 235 is contained by a fluid seal 250 and a wiper seal 251, forcing an inner secondary piston 253 against an inner secondary brake pad 254. The brake pad 254 is in turn forced against the inner annular friction surface of the rotor (not shown).

In a preferred embodiment, the secondary braking system components are essentially the same as the primary braking system components in all respects except diameter. The fluid seal 250 has a square cross-section (not shown) and the wiper seal 251 has a cruciate, or "X" cross-section (not shown). Both have inside diameters corresponding to the outside diameter of the inner secondary piston 253. The wiper seal 251 is preferably a QUAD RING®.

The optimum diameter for the inner secondary piston 253 is 0.750 inch, although it may range up to 1.000 inch without requiring compensating modifications to the front wheel master cylinder (not shown in FIG. 2) or other brake system parts to maintain optimum hydraulic fluid pressure. The diameter may range as far below 0.750 inch as desired, but with a proportionate loss of braking power. The inner secondary cylinder 231 is sized to accommodate the inner secondary piston 253 according to design criteria well known in the art.

When the outer caliper half 210 is fastened to the inner caliper half 220, an outer secondary crossover port (not shown) aligns with the inner secondary crossover port 237, and the interface between the ports is sealed by an O-ring 252. The outer caliper half 210 contains an outer secondary cylinder (not shown) that is the same diameter as and axially aligned with the inner secondary cylinder 231.

Hydraulic pressure applied at the secondary port 235 is transmitted from the inner secondary crossover port 237 to the outer secondary crossover port, then through passages (not shown) within the outer caliper half 210 to the outer secondary cylinder. The hydraulic pressure is contained by the fluid seal 258 and the wiper seal 257, forcing the outer secondary piston 256 against an outer secondary brake pad 255. The outer secondary brake pad 255 is in turn forced against the outer annular friction surface of the rotor (not shown), balancing the opposing pressure by the inner secondary brake pad 254 to create braking friction.

The outer secondary cylinder and corresponding seals 258, 257, piston 256, and brake pad 255 have dimensions essentially of identical to those of the inner secondary cylinder 231 and corresponding seals 250, 251, piston 253, and brake pad 254, respectively.

Both the inner secondary brake pad 254 and the outer secondary brake pad 255 are prevented from moving radially with respect to the rotor by a secondary pin 224 that passes through a pin hole 234 through the inner caliper half, a pin hole 273 in the inner secondary brake pad 254, a pin hole 274 in the outer secondary brake pad 255, and into an axially-aligned pin hole (not shown) that partially penetrates the outer caliper half 210. The secondary pin 224 is held in place by a retaining clip 223, a straight portion of the retaining clip 223 passing through a hole 284 in the secondary pin 224 to lock the secondary pin 224 and the secondary brake pads 254, 255 in place. The secondary brake pads 254, 255 slide freely on the secondary pin 224 in directions normal to the friction surfaces of the rotor. The same retaining clips used for the primary pin 226 may be used for the secondary pin 224.

The inner secondary brake pad 254 rests within a slot 276 milled into the inner caliper half 220. The slot 276 is between 0.005 inch and 0.010 inch wider than the inner secondary brake pad 254 and prevents the pad from moving tangentially with respect to the rotor. Similarly, the outer secondary brake pad 255 rests within a slot 278 milled into the outer caliper half 210. The slot 278 is between 0.005 inch and 0.010 inch wider than the outer secondary brake pad 255 and prevents the pad from moving tangentially with respect to the rotor. An outer rotor slot (not shown) is milled into the lower portion of the outer caliper half 210 to accommodate the passage of the rotor. The outer rotor slot has a radius slightly larger than that of the rotor and is positioned to align with the inner rotor slot 280.

Figure 3:
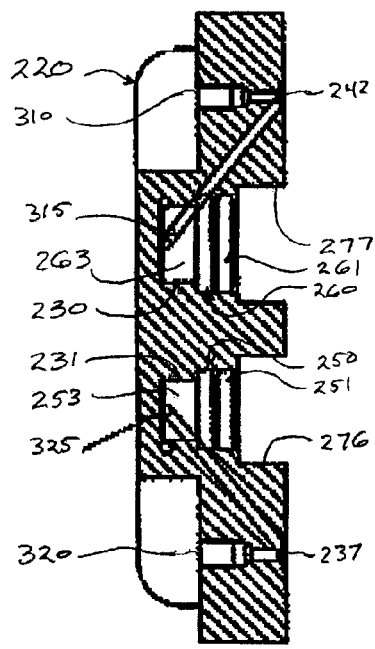
FIG. 3 shows a cross-section of an elevation view of an inner caliper half of the present invention.

FIG. 3 shows a cross-section of an elevation view of the inner caliper half 220. A primary bleeder screw (not shown) screws into a threaded primary bleed port 310 that communicates with the inner primary crossover port 242. The primary bleed port 310 facilitates the removal of air and impurities from within the primary hydraulic system, as is known in the art. Hydraulic pressure within the inner primary cylinder 230 is transmitted through an inner primary passage 315 to the inner primary crossover port 242.

Similarly, a secondary bleeder screw (not shown) screws into a threaded secondary bleed port 320 that communicates with the inner secondary crossover port 237. The secondary bleed port 320 facilitates the removal of air and impurities from within the secondary hydraulic system, as is known in the art. Hydraulic pressure within the inner secondary cylinder 231 is transmitted through an inner secondary passage 325 to the inner secondary crossover port 237. Both the primary and secondary bleeder screws are preferably $\frac{5}{16}$-inch, 90-degree seat screws. Significantly smaller screws do not provide an adequate flow rate, and significantly larger screws are incompatible with compact caliper design.

Figure 4:
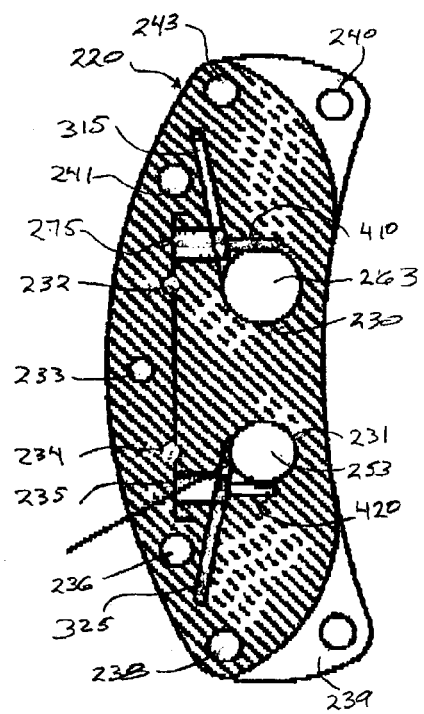
FIG. 4 shows a cross-section of a plan view of an inner caliper half of the present invention.

FIG. 4 shows a cross-section of a plan view of the inner caliper half 220. Hydraulic pressure applied at the primary port 275 is transmitted through a passage 410 to the inner primary cylinder 230. Similarly, hydraulic pressure applied at the secondary port 235 is transmitted through a passage 420 to the inner secondary cylinder 231.

Figure 5:
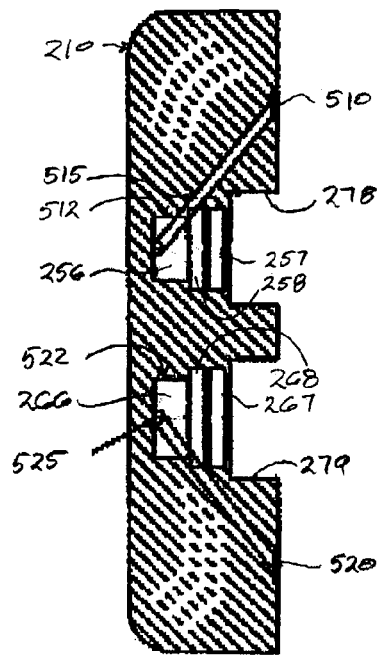
FIG. 5 shows a cross-section of an elevation view of an outer caliper half of the present invention.

FIG. 5 shows a cross-section of an elevation view of the outer caliper half 210. Hydraulic pressure at the inner secondary cross port 237 (shown in FIG. 3) is transmitted through the outer secondary crossover port 510 and the outer secondary passage 515 to the outer secondary cylinder 512. Hydraulic pressure within the outer secondary cylinder 512 is contained by a fluid seal 258 and a wiper seal 257, forcing the outer secondary piston 256 against an outer secondary brake pad 255 (shown in FIG. 2).

Similarly, hydraulic pressure at the inner primary crossover port 242 (shown in FIG. 3) is transmitted through the outer primary crossover port 520 and the outer primary passage 525 to the outer primary cylinder 522. Hydraulic pressure within the outer primary cylinder 522 is contained by a fluid seal 268 and a wiper seal 267, forcing the outer primary piston 266 against an outer primary brake pad 255 (shown in FIG. 2).

Figure 6:
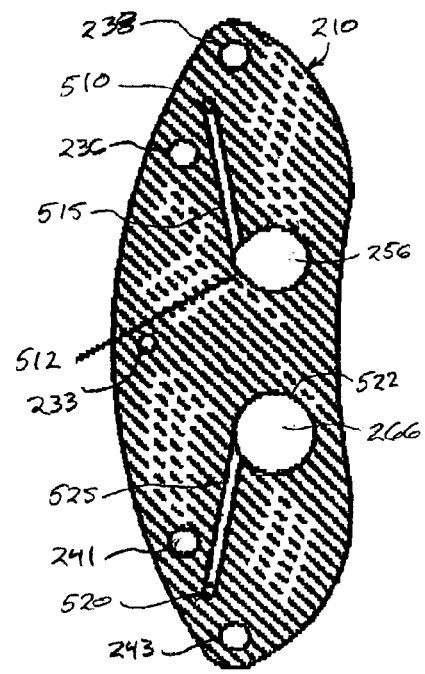
FIG. 6 shows a cross-section of a plan view of an outer caliper half of the present invention.
Figure 7:
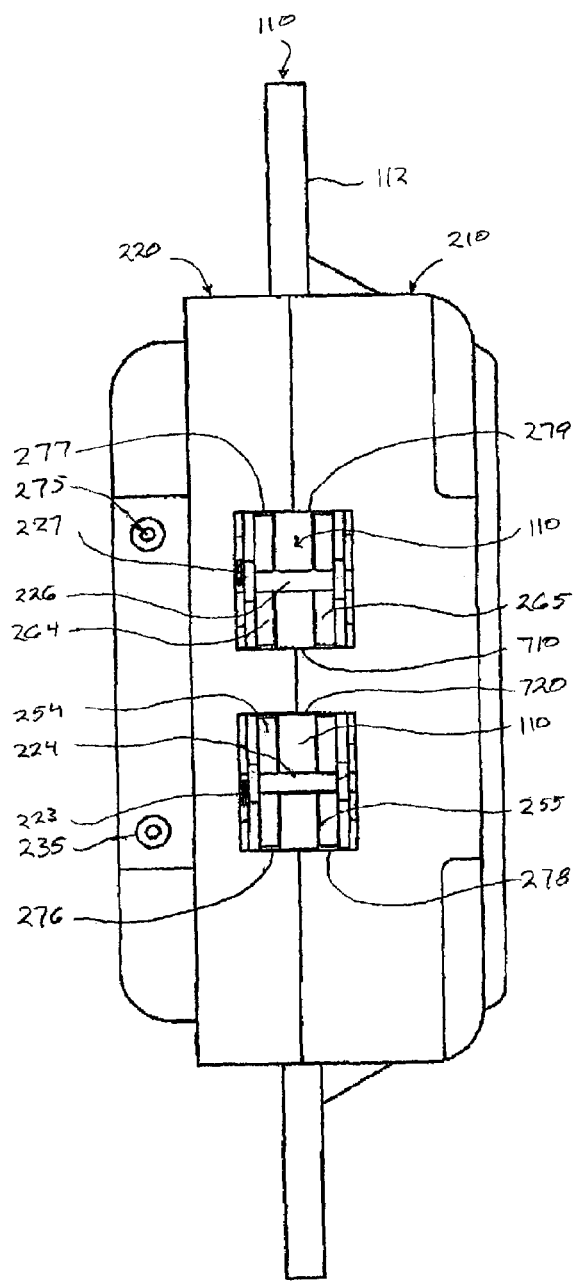
FIG. 7 shows a top view of the assembled disk brake caliper of the present invention.

FIG. 6 shows a cross-section of a plan view of the outer caliper half 210. FIG. 7 shows a top view of the assembled disk brake caliper. Two aligned slots 277, 279 form a rectangular opening 710 that allows easy access to a retaining clip 227, primary pin 226, and the primary brakes pads 264, 265, disposed on either side of the rotor 110. Similarly, two aligned slots 276, 278 form a rectangular opening 720 that allows easy access to a retaining clip 223, secondary pin 224, and the secondary brakes pads 254, 255, disposed on either side of the rotor 110. The rectangular openings 710, 720 facilitate inspection and replacement of brake pads.

Figure 8:
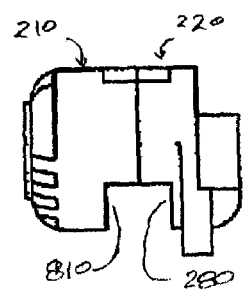
FIG. 8 shows an end view of the assembled disk brake caliper of the present invention.

FIG. 8 shows an end view of the assembled disk brake caliper. An outer rotor slot 810 is milled into the outer caliper half 210 with a radius to accommodate the rotor (not shown). Similarly, an inner rotor slot 280 is milled into the inner caliper half 220 with the same radius to accommodate the rotor.

Figure 9:
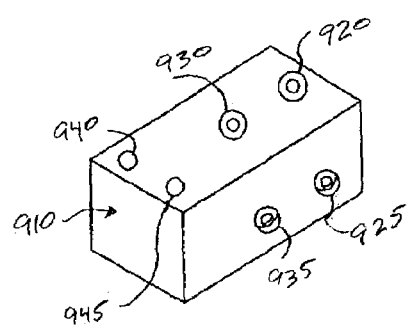
FIG. 9 shows an isometric view of a hydraulic fluid distribution block as used in a preferred embodiment of the present invention.

FIG. 9 shows a hydraulic fluid distribution block 910 as used in a preferred embodiment of the present invention. The hydraulic fluid distribution block 910 is mounted on a vehicle by socket head cap screws or other known fasteners (not shown) passing through holes 940, 945 in the hydraulic fluid distribution block 910. A hydraulic supply line (not shown) is attached to a first intake port 920. A second hydraulic supply line (not shown) is attached to a second intake port 930.

Figure 10:
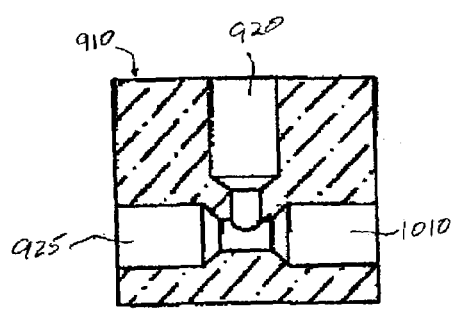
FIG. 10 shows a cross-section of an end view of the hydraulic fluid distribution block of FIG. 9.

FIG. 10 shows a cross section of an end view of the hydraulic fluid distribution block 910. Hydraulic pressure applied to the first intake port 920 is distributed to two output ports 925, 1010. The port configuration shown in FIG. 10 is duplicated for a second intake port 930 (shown in FIG. 9), which distributes hydraulic pressure applied to the second intake port 930 to an output port 935 (shown in FIG. 9) and a similar output port (not shown) on the opposite side of hydraulic fluid distribution block 910. The output ports supplied by the first intake port 920 do not communicate with the output ports supplied by the second intake port 930. The cylinder actuation pattern described above may vary somewhat between different makes and models of motorcycles, but the essential functions remain the same.

The present invention as described above provides a means for modifying a motorcycle braking system when the motorcycle is converted to a trike. To better understand how the conversion is effected and why it is necessary, it is useful to review the mechanism and operation of the braking system of a motorcycle prior to conversion.

Figure 11:
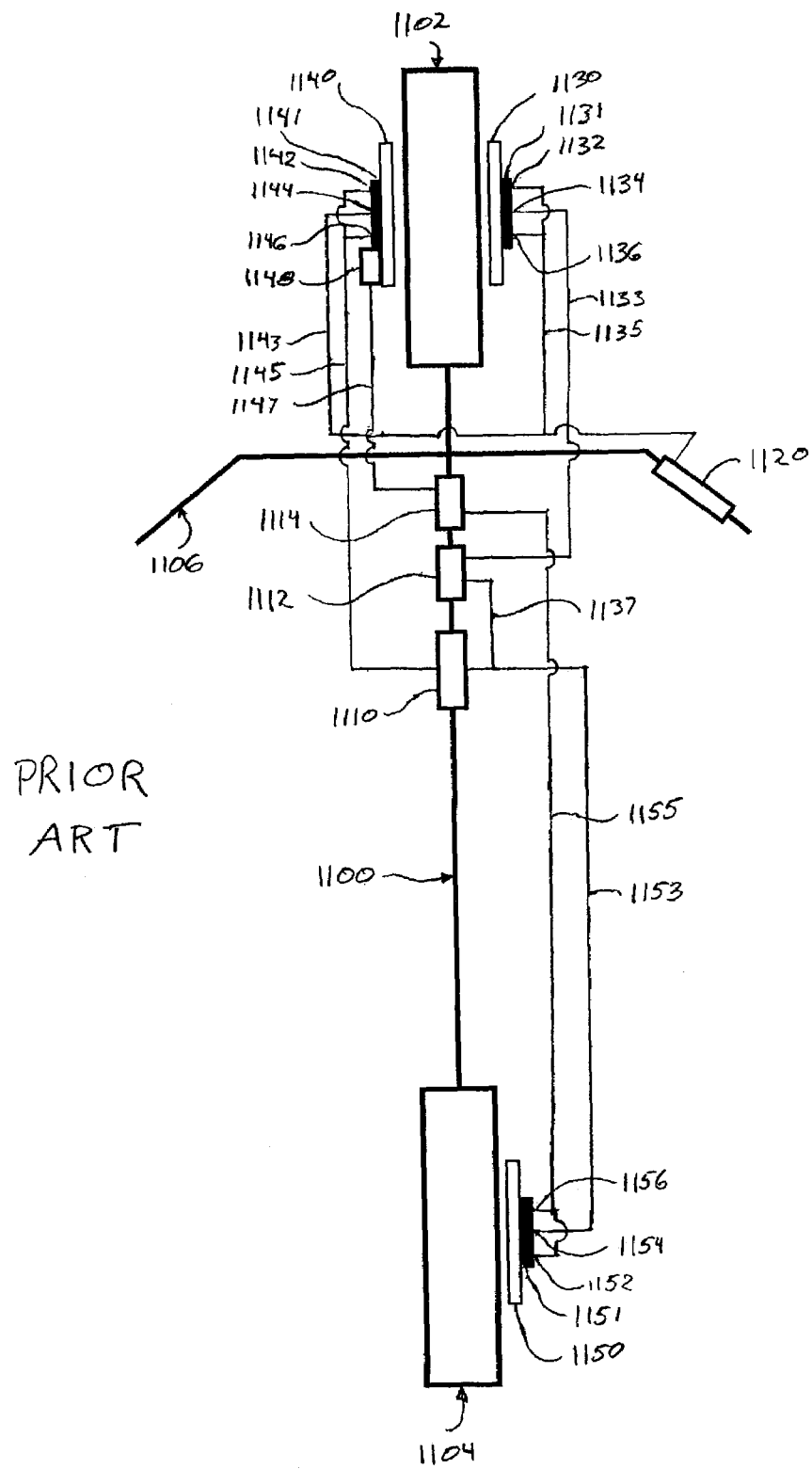
FIG. 11 shows a simplified schematic of the braking system of a HONDA® Model GL1800 motorcycle as is known in the art.

FIG. 11 shows a simplified schematic of the braking system of a HONDA® Model GL1800 motorcycle as is known in the art. A front wheel 1102 and a rear wheel 1104 support a chassis 1100 and handlebars 1106 that rotate the front wheel 1102 to steer the vehicle. Since more braking force is usually applied to the front wheel 1102 than to the rear wheel 1104, the vehicle is equipped with two front wheel rotors 1130, 1140 and brake calipers 1131, 1141 and a single rear wheel rotor 1150 and brake caliper 1151. Each caliper has three pistons, each piston actuating a separate brake pad.

When an operator depresses the brake pedal (not shown) the foot brake master cylinder 1110 is actuated, increasing hydraulic pressure in connected hydraulic lines 1153, 1137, 1145. One hydraulic line 1153 actuates the center piston 1154 of the rear brake caliper 1151. A second hydraulic line 1145 actuates the two outer pistons 1142, 1146 of the left front brake caliper 1141. A third hydraulic line 1137 transmits pressure to a delay valve 1112 that briefly delays transmission of pressure through a hydraulic line 1133 to the center piston 1134 of the right front brake caliper 1131, allowing the operator to briefly direct more braking force to the rear wheel 1104 to make minor speed adjustments on low-traction surfaces. Once the delay period is exceeded, the right front brake caliper 1131 is partially engaged, providing additional braking torque to the front wheel 1102.

When an operator compresses the hand brake lever (not shown), the hand brake master cylinder 1120 is actuated, transmitting pressure directly to two hydraulic lines 1135, 1143. Pressure in one hydraulic line 1135 actuates the two outer pistons 1132, 1136 of front right brake caliper 1131. Pressure in the other hydraulic line 1143 actuates the center piston 1144 of the left front brake caliper 1141.

As the front left brake caliper 1141 is engaged, torque on the caliper moves the caliper with respect to a secondary master cylinder 1148, actuating the secondary master cylinder 1148 and transmitting pressure to a proportional control valve 1114 via a line 1147. The proportional control valve 1114 adjusts transmitted pressure according to braking conditions and transmits adjusted pressure through a line 1155 to actuate the two outer rear brake pistons 1152, 1156 of the rear brake caliper 1151, thereby providing some rear braking action even when the hand brake lever alone is engaged.

As is readily apparent, the braking system just described is complex and carefully balanced to provide optimum braking for a two-wheeled vehicle. However, when the two-wheeled vehicle is converted to a three-wheeled vehicle, the balance of braking pressures provided to the rear wheels is no longer optimum.

Since a motorcycle tends to pitch forward when braking, placing more downward, friction-producing force on the front wheel, the optimum front-to-rear ratio of braking force for a motorcycle is typically about 60% front to 40% rear. To provide this ratio regardless of operator misjudgment, some motorcycle manufacturers have equipped their products with braking systems that link the front and rear brakes with control systems that automatically allocate braking pressure at this ratio no matter which master cylinder or combination of cylinders is actuated.

The trike, however, has two wheels in the rear, and each rear wheel is usually larger than the rear wheel of a motorcycle. The result is more road contact area and braking friction. Larger wheels allow the use of larger brake rotors. If each wheel is equipped with a brake, the resulting increase in hydraulic system volume may exceed the capacity of the actuating master cylinder, causing a drop in braking pressure. Also, a trike often carries more weight in the rear in the form of passengers and luggage. An unsuitable balance of braking pressure between the front wheel and rear wheels of a trike may result in ineffective and erratic braking and may in some cases destabilize the vehicle. An optimum front-to-rear braking pressure balance for a HONDA® Model GL1800 motorcycle converted to a trike is 50/50, but other ratios may be desirable for specific vehicle models, control systems, and configurations.

Some braking system modifications must clearly be made during a conversion, but cost and safety issues make it highly desirable that those modifications be simple and easy to implement. A variety of relatively crude modifications are known in the art but do not provide the ability to retain the advantages of the original linked braking system while optimizing the manner in which the rear wheel calipers respond to the output of each master cylinder.

Figure 12:
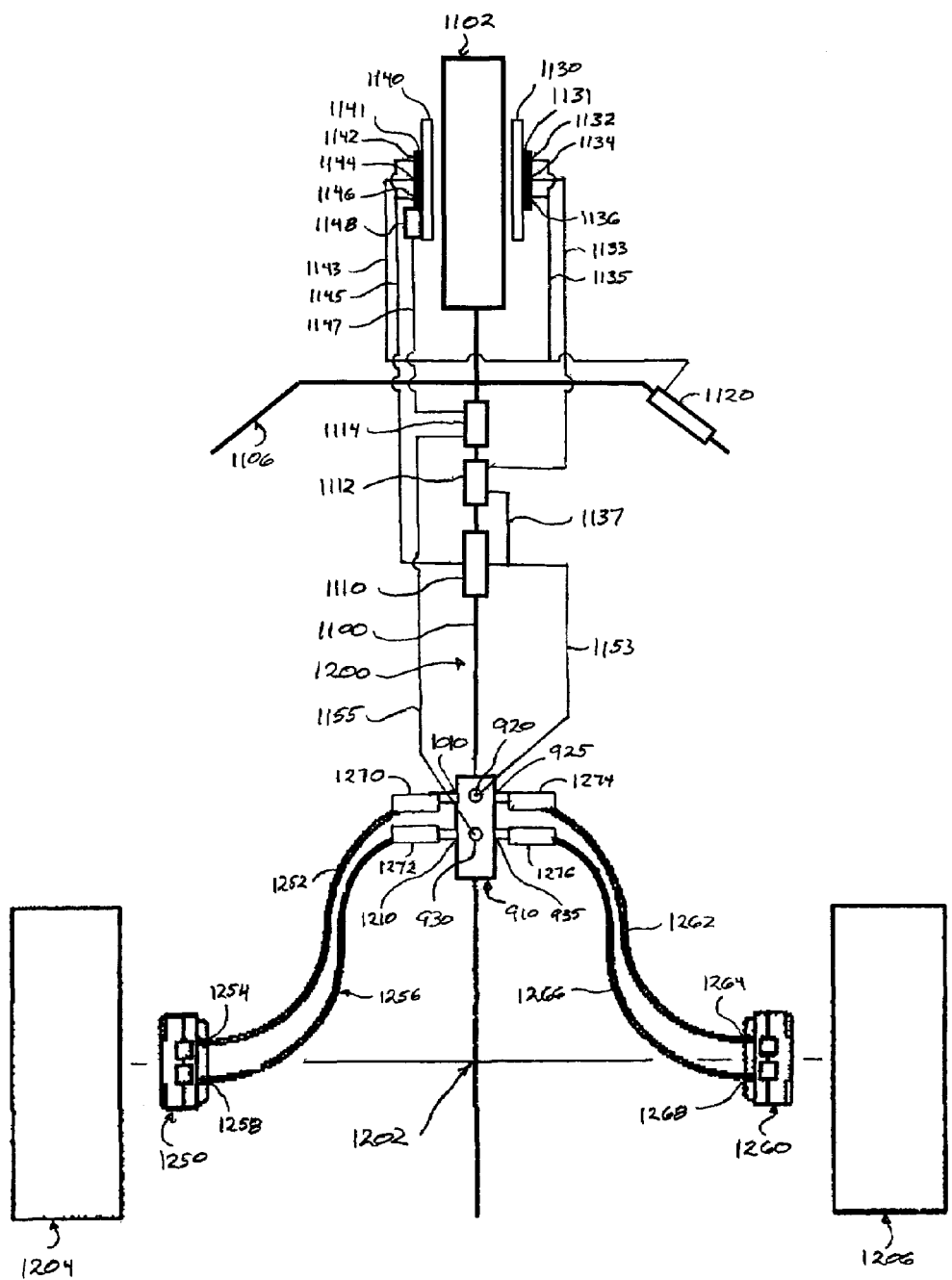
FIG. 12 shows a simplified schematic of a preferred embodiment of the present invention as installed on a HONDA® Model GL1800 motorcycle converted to a three-wheeled vehicle.

The present invention provides such modifications. FIG. 12 shows a simplified schematic of a preferred embodiment of the present invention as installed on a HONDA® Model GL1800 motorcycle converted to a three-wheeled vehicle. The three-wheeled chassis 1200 comprises the engine (not shown), front wheel 1102, handle bars 1106, and most of the original control systems and two-wheeled chassis 1100 except for the rear wheel, rear brakes, and rear suspension. In place of the rear components of the two-wheeled vehicle are mounted a modified chassis 1202 with a left rear wheel 1204, a right rear wheel 1206, and the modified rear braking system of the present invention.

During modification, the rear brake components of the two-wheeled vehicle are disconnected and the rear suspension components (not shown), rear wheel 1104 (shown in FIG. 11), and rear brake components 1150, 1151, 1152, 1154, 1156 (shown in FIG. 11) are removed. As shown in FIG. 12, these components are replaced by a modified chassis 1202, a left rear wheel 1204, a right rear wheel 1206, a hydraulic fluid distribution block 910, hydraulic lines 1252, 1256, 1262, 1266, a left rear brake caliper 1250, and a right rear brake caliper 1260.

The hydraulic line 1153 from the foot brake master cylinder 1110 is connected to the first intake port 920 on the hydraulic fluid distribution block 910 to actuate the primary brake assemblies. Fluid pressure applied to the first intake port 920 is distributed to an output port 925, which in a preferred embodiment transmits pressure to a residual pressure control valve 1274. The residual pressure control valve 1274 is in turn connected through a hydraulic line 1262 to a right primary port 1264 (corresponding to the primary port 275 shown in FIG. 7) in a right brake caliper 1260 (essentially identical to the brake caliper shown in FIG. 7) mounted proximate to the right wheel 1206.

The residual pressure control valve 1274 maintains a pressure of approximately 2 psi within the hydraulic line 1262 and the right brake caliper 1260, essentially taking up "slack" between system components and thereby reducing the time required for the right brake caliper 1260 to respond to pressure applied by the foot brake master cylinder 1110.

Fluid pressure applied to the first intake port 920 is also distributed to the output port 1010, which in a preferred embodiment transmits pressure to a residual pressure control valve 1270. The residual pressure control valve 1270 is in turn connected through a hydraulic line 1252 to a left primary port 1254 in a left brake caliper 1250 mounted proximate to the left wheel 1204. The left brake caliper 1250 is essentially a mirror image of the right brake caliper 1260, with an outer caliper section rotated 180 degrees to face the left wheel 1204, but with the primary brake assembly still nearest the front of the vehicle.

The hydraulic line 1155 from the proportional control valve 1114 is connected to the second intake port 930 to actuate the secondary brake assemblies. Fluid pressure applied to the second intake port 930 is distributed to an output port 935, which in a preferred embodiment transmits pressure to a residual pressure control valve 1276. The residual pressure control valve 1276 is in turn connected through a hydraulic line 1266 to a right secondary port 1268 (corresponding to the secondary port 235 shown in FIG. 7) in the right brake caliper 1260.

Fluid pressure applied to the first intake port 930 is also distributed to an output port 1210, which in a preferred embodiment transmits pressure to a residual pressure control valve 1272. The residual pressure control valve 1272 is in turn connected through a hydraulic line 1256 to a left secondary port 1258 in a left brake caliper 1250. Each residual pressure control valve 1270, 1272, 1274, 1276 has the same characteristics and performs the same function.

When an operator depresses the brake pedal (not shown) the foot brake master cylinder 1110 is actuated, increasing hydraulic pressure in connected hydraulic lines 1153, 1137, 1145. One hydraulic line 1153 transmits pressure to primary ports 1254, 1264 in the rear brake calipers 1250, 1260, actuating the rear primary brake assemblies, which, having larger pistons, create greater braking force than the single piston actuated in the two-wheeled vehicle.

A second hydraulic line 1145 actuates the two outer pistons 1142, 1146 of the left front brake caliper 1141. A third hydraulic line 1137 transmits pressure to a delay valve 1112 that briefly delays transmission of pressure through a hydraulic line 1133 to the center piston 1134 of the right front brake caliper 1131, allowing the operator to briefly direct more braking force to the rear wheel 1104 to make minor speed adjustments on low-traction surfaces. Once the delay period is exceeded, the right front brake caliper 1131 is partially engaged, providing additional braking torque to the front wheel 1102.

When an operator compresses the hand brake lever (not shown), the hand brake master cylinder 1120 is actuated, transmitting pressure directly to two hydraulic lines 1135, 1143. Pressure in one hydraulic line 1135 actuates the two outer pistons 1132, 1136 of front right brake caliper 1131. Pressure in the other hydraulic line 1143 actuates the center piston 1144 of the left front brake caliper 1141.

As the front left brake caliper 1141 is engaged, torque on the caliper moves the caliper with respect to a secondary master cylinder 1148, actuating the secondary master cylinder 1148 and transmitting pressure to a proportional control valve 1114 via a line 1147. The proportional control valve 1114 adjusts transmitted pressure according to braking conditions and transmits adjusted pressure through a line 1155 to the secondary ports 1258, 1268 in the rear brake calipers 1250, 1260, actuating the rear secondary brake assemblies, providing some rear braking action even when the hand brake lever alone is engaged.

As described above and shown in FIGS. 3 and 5, the outer secondary cylinder 512 and the inner secondary cylinder 231 are of a smaller diameter than the outer primary cylinder 522 and inner primary cylinder 230. Since a large hydraulic piston produces more force at a given hydraulic pressure than a small piston, the size difference produces a proportionate difference in pressures exerted by the primary and secondary braking systems. Combined with the ability to operate the primary and secondary braking systems independently, selection of primary and secondary cylinder diameters and of the ratio between these diameters therefore provides a means for selecting the ratio of front-to-rear braking pressures while retaining the safety features of a linked braking system. As long as the cylinder diameters chosen do not increase the hydraulic system volume beyond the output capacities of the master cylinders, the present invention facilitates the simple, effective, and safe conversion of a motorcycle to a trike with no changes to the master brake cylinders or front wheel braking system.

The preferred primary and secondary cylinder diameters described above are optimized for use with HONDA® Linear Braking Systems and Automatic Braking Systems as used on HONDA® Model GL1800 motorcycles for years 2001 through 2003. However, those skilled in the art can readily see that other cylinder diameters and ratios may be determined and used to optimize performance for other braking systems, and that the present invention is in no way limited to use with HONDA® motorcycles or even to three-wheeled vehicles.

The principles, embodiments, and modes of operation of the present invention have been set forth in the foregoing specification. The embodiments disclosed herein should be interpreted as illustrating the present invention and not as restricting it. For example, the present invention may integrate any desired number of independent braking cylinders into one caliper. Alternatively, more than one caliper may be used to brake each wheel, either on the same rotor or on different rotors, with each caliper that is braking a given wheel connected to a separate master cylinder output or combination of master cylinder outputs and with the ratios between wheel cylinder diameters chosen to provide an optimum brake pressure distribution. A caliper may contain pairs of opposing cylinders or may be free-floating with a single cylinder for each input line.

The foregoing disclosure is not intended to limit the range of equivalent structure available to a person of ordinary skill in the art in any way, but rather to expand the range of equivalent structures in ways not previously contemplated. Numerous variations and changes can be made to the foregoing illustrative embodiments without departing from the scope and spirit of the present invention.

We claim:

1. A brake caliper, comprising:

a housing;

a rotor slot, the rotor slot disposed within the housing, the rotor slot having an inner side and an outer side, the inner side being parallel to the outer side;

a first hydraulic system, the first hydraulic system comprising a first hollow cylinder, a first piston, a first seal, a second hollow cylinder, a second piston, a second seal, at least a first internal passage, and at least a first port;

the first hollow cylinder penetrating the housing, a first end of the first hollow cylinder forming an opening in the inner side, a second end of the first hollow cylinder disposed within the housing, the first piston slideably disposed within the first hollow cylinder and capable of protruding through the first end of the first hollow cylinder into the rotor slot, the first seal forming a hydraulic seal between the first hollow cylinder and the circumference of the first piston;

the second hollow cylinder penetrating the housing, a first end of the second hollow cylinder forming an opening in the outer side, a second end of the second hollow cylinder disposed within the housing, the second hollow cylinder having the same diameter as and being axially aligned with the first hollow cylinder, the common axis of the first hollow cylinder and the second hollow cylinder being normal to the planes of the inner side and the outer side; the second piston slideably disposed within the second hollow cylinder and capable of protruding through the first end of the second hollow cylinder into the rotor slot, the second piston having the same diameter as the first piston; the second seal forming a hydraulic seal between the second hollow cylinder and the circumference of the second piston;

a first brake pad, the first brake pad positioned to be urged into the rotor slot by the first piston, means for moveably positioning the first brake pad;

a second brake pad, the second brake pad positioned to be urged into the rotor slot by the second piston, means for moveably positioning the second brake pad;

the first internal passage being capable of transmitting hydraulic fluid between the first hollow cylinder and the second hollow cylinder, the first internal passage hydraulically connected to the first hollow cylinder at at least one point from the first seal to the second end of the first hollow cylinder, the first internal passage hydraulically connected to the second hollow cylinder at at least one point from the second seal to the second end of the second hollow cylinder;

the first port operable to connect to a source of hydraulic pressure and to transmit hydraulic pressure to the first hydraulic system;

a second hydraulic system, the second hydraulic system hydraulically isolated from the first hydraulic system, the second hydraulic system comprising a third hollow cylinder, a third piston, a third seal, a fourth hollow cylinder, a fourth piston, a fourth seal, at least a second internal passage, and at least a second port, the first hollow cylinder having a larger diameter than the third hollow cylinder;

the third hollow cylinder penetrating the housing, a first end of the third hollow cylinder forming an opening in the inner side, a second end of the third hollow cylinder disposed within the housing, the third piston slideably disposed within the third hollow cylinder and capable of protruding through the first end of the third hollow cylinder into the rotor slot, the third seal forming a hydraulic seal between the third hollow cylinder and the circumference of the third piston;

the fourth hollow cylinder penetrating the housing, a first end of the fourth hollow cylinder forming an opening in the outer side, a second end of the fourth hollow cylinder disposed within the housing, the fourth hollow cylinder having the same diameter as and being axially aligned with the third hollow cylinder, the common axis of the third hollow cylinder and the fourth hollow cylinder being normal to the planes of the inner side and the outer side; the fourth piston slideably disposed within the fourth hollow cylinder and capable of protruding through the first end of the fourth hollow cylinder into the rotor slot, the fourth piston having the same diameter as the third piston; the fourth seal forming a hydraulic seal between the fourth hollow cylinder and the circumference of the fourth piston;

a third brake pad, the third brake pad positioned to be urged into the rotor slot by the third piston, means for moveably positioning the third brake pad;

a fourth brake pad, the fourth brake pad positioned to be urged into the rotor slot by the fourth piston, means for moveably positioning the fourth brake pad;

the second internal passage being capable of transmitting hydraulic fluid between the third hollow cylinder and the fourth hollow cylinder, the second internal passage hydraulically connected to the third hollow cylinder at at least one point from the third seal to the second end of the third hollow cylinder, the second internal passage hydraulically connected to the fourth hollow cylinder at at least one point from the fourth seal to the second end of the fourth hollow cylinder; and the second port operable to connect to a source of hydraulic pressure and to transmit hydraulic pressure to the second hydraulic system.

* * * * *